(12) United States Patent
Tobin, Jr. et al.

(10) Patent No.: US 6,195,412 B1
(45) Date of Patent: Feb. 27, 2001

(54) CONFOCAL CODED APERTURE IMAGING

(75) Inventors: Kenneth William Tobin, Jr., Harriman; Clarence E. Thomas, Jr., Knoxville, both of TN (US)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

(21) Appl. No.: 09/266,055

(22) Filed: Mar. 10, 1999

(51) Int. Cl.[7] .................................................. G01T 1/161
(52) U.S. Cl. ........................ 378/87; 378/57; 250/363.03; 356/310
(58) Field of Search .................................. 378/2, 57, 62, 378/87, 86, 88, 89; 250/363.06; 356/310

(56) References Cited

U.S. PATENT DOCUMENTS

| | | | |
|---|---|---|---|
| 4,209,780 | * 6/1980 | Fenimore et al. | 250/363.03 |
| 5,432,349 | * 7/1995 | Wood et al. | 378/149 |
| 5,757,005 | * 5/1998 | Callas et al. | 250/363.03 |
| 5,940,468 | * 8/1999 | Huang et al. | 378/57 |

OTHER PUBLICATIONS

Fenimore et al, "Coded Aperture Imaging with Uniformly Redundant Arrays," *Applied Optics*, vol. 17, No. 3, pp. 337–347 (Feb. 1, 1978).

Tobin et al, "Three–Dimensional Information from Real–Time Encoded Images," *Optical Engineering*, vol. 29, No. 1 pp. 52–57 (Jan. 1990).

Chen et al, "Design and Fabrication of Fresnel Zone Plates with Large Numbers of Zones," *J. Vac. Sci. Technol. B* 15(6), pp. 2522–2527 (Nov./Dec. 1997).

* cited by examiner

*Primary Examiner*—David V. Bruce
*Assistant Examiner*—Drew A. Dunn
(74) *Attorney, Agent, or Firm*—Akerman, Senterfitt & Eidson, P.A.

(57) ABSTRACT

A method for imaging a target volume comprises the steps of: radiating a small bandwidth of energy toward the target volume; focusing the small bandwidth of energy into a beam; moving the target volume through a plurality of positions within the focused beam; collecting a beam of energy scattered from the target volume with a non-diffractive confocal coded aperture; generating a shadow image of said aperture from every point source of radiation in the target volume; and, reconstructing the shadow image into a 3-dimensional image of the every point source by mathematically correlating the shadow image with a digital or analog version of the coded aperture. The method can comprise the step of collecting the beam of energy scattered from the target volume with a Fresnel zone plate.

34 Claims, 2 Drawing Sheets

CONFOCAL CODED APERTURE IMAGING

STATEMENT REGARDING FEDERALLY-SPONSORED RESEARCH OR DEVELOPMENT

This invention was made with government support under contract DE-AC05-96OR22464, awarded by the United States Department of Energy to Lockheed Martin Energy Research Corporation, and the United States Government has certain rights in this invention.

BACKGROUND OF THE INVENTION

1. Field of the Invention

The invention relates to the field of energy beam imaging, and in particular, to a method and apparatus for x-ray imaging sub-volumes by sequentially filtering and focusing individual source points with a confocal coded aperture.

2. Description of Related Art

The ability to non-destructively analyze microscopic volumes within large objects, for example multi-layer microelectronic packages, requires use of penetrating radiations such as X-rays. Current techniques for inspecting these volumes typically employ transmission radiography, which is similar to medical X-ray imaging. Computed tomography (CT) can be used to view individual planes of interest in such packages. The resolution of these systems is limited by the x-ray source, that is, the system resolution defined by the spot size of the X-ray source. Transmission methods suffer from an inability to differentiate three-dimensional information. In other words, a p three-dimensional space must be mapped onto a two-dimensional plane. Moreover, techniques such as CT require that the whole object be inspected, which can unnecessarily generate large quantities of data and require computationally intensive and time-consuming reconstruction processes to mitigate CT image artifacts.

Coded aperture imaging systems were historically developed to image points of non-focusable radiation from sources such as x-ray or gamma stars, and discrete, localized nuclear events. The literature describes many attempts to use coded apertures to image extended two-dimensional and three-dimensional objects, but the results have never exceeded the type of resolution and detail achievable through other means, such as transmission or computed tomographic (CT) radiography. This limitation on resolution and detail is primarily due to the coded aperture impulse or frequency response and the response of the system to out-of-plane sources of scattered radiation. Since all previous systems attempt to image the entire object instantaneously, the degrading effects of the aperture quickly become dominant as the size of the object increases.

The technology associated with coded aperture imaging has been around since the late 1970's. The earliest work in the field, using coded aperture arrays, is described in "Coded Aperture Imaging with Uniformly Redundant Arrays", E. E. Fenimore, and T. M. Cannon, Feb. 1, 1978, *Applied Optics*, Vol. 17, No. 3, pp. 7–347.

Coded aperture imaging using neutron sources during the early 1990's is described in "Three-Dimensional Information from Real-Time Encoded Images", K. W. Tobin, J. S. Brenizer, and J. N. Mait, *Optical Engineering*, Vol. 29, No. 1, January, 1990.

The nature and characteristics of Fresnel zone plate (FZP) X-ray source focusing technology is described in "Design and Fabrication of Fresnel Zone Plates with Large Number of Zones", Z. Chen, Vladimirsky, M. Brown, Q. Leonard, O. Vladimirsky, F. Moore, F. Cerrina, B. Lai, W. Yuri, and E. Gluskin, J. Vac., *Sci. Technology*, B 15(6), November/December 1997, p. 2522.

An x-ray spectrometer is described in U.S. Pat. No. 5,757,005—Callas, et al. that provides images of an x-ray source. Coded aperture imaging techniques are used to provide high resolution images. Imaging position-sensitive x-ray sensors with good energy resolution are utilized to provide what is described as excellent spectroscopic performance. The system produces high resolution spectral images of the x-ray source which can be viewed in any one of a number of specific energy bands.

A system utilizing uniformly redundant arrays to image non-focusable radiation is disclosed in U.S. Pat. No. 4,209,780—Fenimore, et al. A uniformly redundant array is used in conjunction with a balanced correlation technique to provide a system said to have no artifacts, such that virtually limitless signal-to-noise ratio is obtained with high transmission characteristics. Additionally, the array is formed as a mosaic to reduce required detector size over conventional array detectors.

Many other patents and publications reference coded aperture imaging techniques but they are all based on imaging a single, localized source of scattered energy, such as celestial sources, or instantaneously imaging a distributed source of energy from an extended body. There are no other known techniques that utilize the inventive arrangements taught herein.

Accordingly, there is a need for a new method and apparatus for imaging three-dimensional objects, particularly for imaging small volumes of interest within a larger volume or object, using non-focusable radiation.

SUMMARY OF THE INVENTION

The need for a new method and apparatus for imaging three-dimensional objects, particularly for imaging small volumes of interest within a larger volume or object, using non-focusable radiation, is satisfied by a method and apparatus which utilizes a confocal coded aperture to image three dimensional objects. The complimentary steps of imaging one primary point of focused X-ray energy, and by shielding or baffling the detector system to reduce the collection of stray sources of scattered energy, make possible high resolution, high-speed data collection and image displays.

Confocal coded aperture (CCA) imaging is a new method for imaging small volumes of interest within a larger volume or object using non-focusable radiation. The technique depends on the availability of a small, highly focused spot of X-ray energy generated by a Fresnel zone plate (FZP) or similar diffractive optic. The focal point of the highly focused spot of X-ray beam is scattered from the internal structure of a target inspection volume. The reconstruction of the point of the scattered X-ray beam is accomplished using a highly efficient coded aperture. As the spot is scanned through the volume of interest, a reconstruction and visualization of the structure and material characteristics is non-destructively achieved. The method overcomes limitations usually observed with image reconstructions based on coded apertures by filtering and focusing one source point at a time.

The CCA system taught herein makes use of a new technique for focusing the x-ray source that can achieve a very high resolution spot, for example on the order of less than 0.5 microns. The focused x-ray spot is scanned through a small volume of interest within the object. The scattered spot at a given coordinate is reconstructed using a highly efficient, non-diffractive collection aperture known as a coded aperture. The coded aperture is uniquely configured with a shielding baffle to mitigate collection of scattered energy from other coordinates within the volume. A digital correlation reconstruction algorithm is used to further focus and reconstruct the energy scattered from the point of interest in the target volume. As the x-ray spot is scanned through a three-dimensional sub-volume of the object, a high-resolution image is obtained representing both the structural and material characteristics of the object. This information is suitable, for example, for the non-destructive detection and analysis of the various manufacturing anomalies that can occur in complex, three-dimensional objects.

A method for imaging a target volume, in accordance with the inventive arrangements, comprises the steps of: radiating a small bandwidth of energy toward the target volume; focusing the small bandwidth of energy into a beam; moving the target volume through a plurality of positions within the focused beam; collecting a beam of energy scattered from the target volume with a non-diffractive confocal coded aperture; generating a shadow image of the aperture from every point source of radiation in the target volume; and, reconstructing the shadow image into a 3-dimensional image of the every point source by mathematically correlating the shadow image with a version of the coded aperture.

The method can further comprise the step of correlating the shadow image with a digital or analog version of the coded aperture.

The method can comprise the step of generating the shadow image of the aperture by integrating and amplifying the beam of energy scattered from the target volume collected with the aperture. The integrating and amplifying step can be implemented with an image intensification screen or a photo multiplier tube.

The method can further comprise the step of shielding the aperture.

The method can comprise the step of radiating the small bandwidth of energy with x-rays.

The method can comprise the step of diffracting the small bandwidth of energy into the focused beam with a Fresnel zone plate.

The method can comprise the step of incrementally stepping the target volume through the plurality of positions.

The method can comprise the step of continuously moving the target volume through the plurality of positions.

The method can comprise the step of collecting the beam of energy scattered from the target volume with a coded aperture construct exhibiting a desired impulse response characteristic, utilizing a uniformly redundant array, a random pinhole array or a Fresnel zone plate.

The method can further comprise the step of shielding around the small bandwidth of energy during the diffracting step.

The method can further comprise the step of selecting the small bandwidth of energy by directing a broad spectrum of the energy at a diffractive reflector.

The method can comprise the step of radiating x-ray energy.

An apparatus for imaging a target volume, in accordance with the inventive arrangements, comprises: a radiation source of a small bandwidth of energy; a diffractive member for focusing the small bandwidth of energy into a focused beam illuminating the target volume; a carrier for moving the target volume through a plurality of positions within the focused beam; a non-diffractive confocal coded aperture for collecting a beam of energy scattered from the target volume; an integrating amplifier onto which a shadow image of the aperture is transmitted from every point source of radiation in the target volume; and, means for reconstructing the shadow image into a 3-dimensional image of the every point source by mathematically correlating the shadow image with a version of the coded aperture.

The integrating amplifier can comprise an intensifier screen or a photo multiplier.

The shadow image can be correlated with a digital or analog version of the coded aperture.

The apparatus can further comprise shielding for the aperture.

The small bandwidth of energy can be x-ray energy.

The diffractive member can comprise a Fresnel zone plate.

The carrier can incrementally step the target volume through the plurality of positions.

The carrier can continuously move the target volume through the plurality of positions.

The non-diffractive coded aperture can comprise a Fresnel zone plate.

The non-diffractive coded aperture can comprise a uniformly redundant array.

The apparatus can further comprise shielding around the diffractive member.

The apparatus can further comprise a diffractive reflector for selecting the small bandwidth of energy.

Another apparatus for imaging a target volume, in accordance with the inventive arrangements, comprises: a radiation source of a small bandwidth of energy; a diffractive member for focusing the small bandwidth of energy into a focused beam illuminating the target volume; a carrier for moving the target volume through a plurality of positions within the focused beam; at least two sets of detectors for collecting respective parts of a beam of energy scattered from the target volume, each of the at least two sets of detectors having respective non-diffractive confocal coded collecting apertures and respective integrating amplifiers onto which respective shadow images of the respective apertures are transmitted from every point source of radiation in the target volume in the respective part of the beam; and, means for reconstructing the respective shadow images into respective 3-dimensional images.

The reconstructing means can comprise means for mathematically correlating the respective shadow images with respective versions of the respective coded apertures.

The reconstructing means further comprise means for combining output signals generated by the respective integrating amplifiers.

The integrating amplifiers can comprise photo multiplier tubes.

DETAILED DESCRIPTION OF THE PREFERRED EMBODIMENTS

Figure 1:
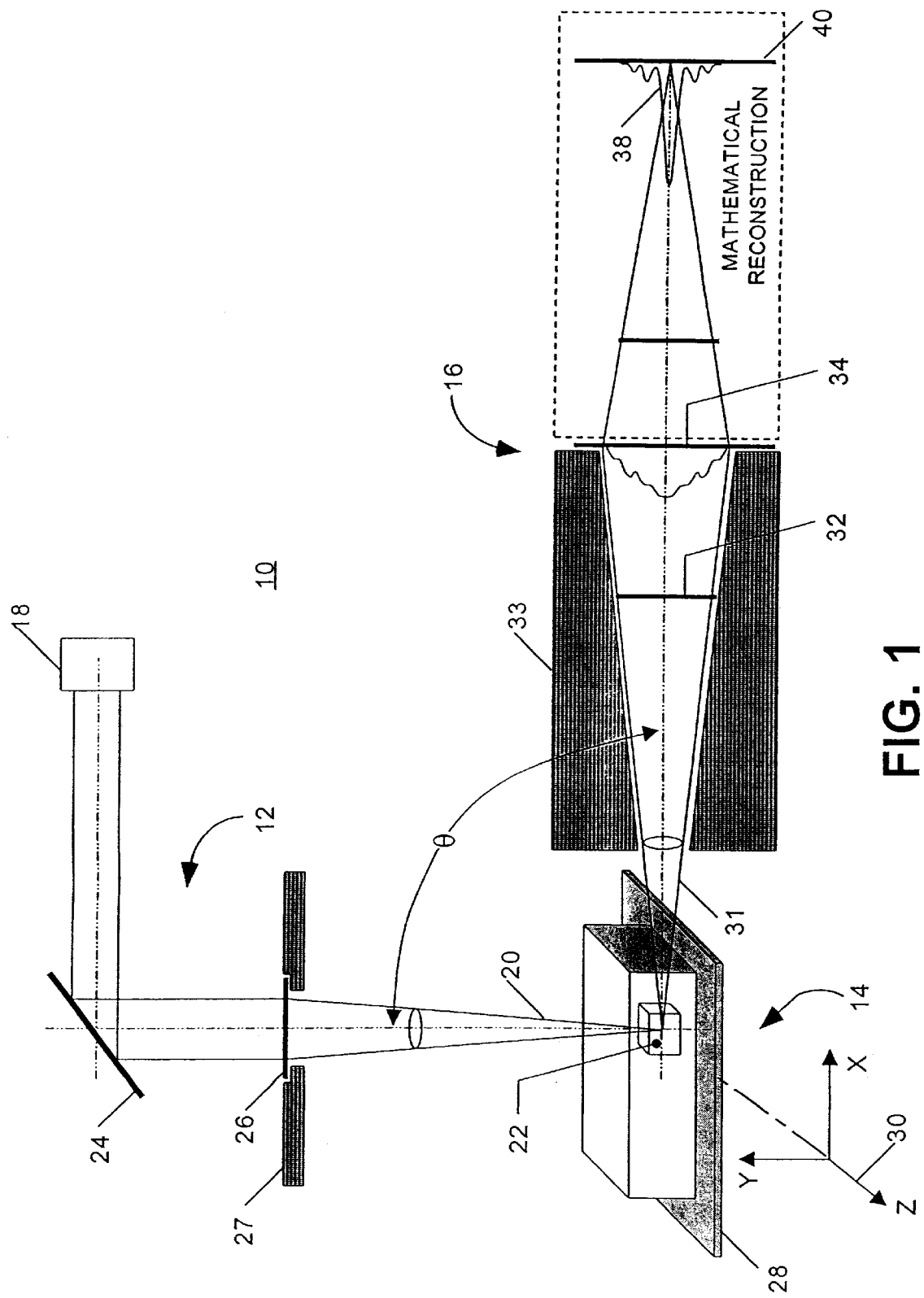
FIG. 1 is a schematic diagram of an imaging apparatus, using a confocal coded aperture and detector shielding, in accordance with the inventive arrangements.

A schematic representation of the CCA system 10 is shown in FIG. 1. This schematic shows three separate functional modules that are required to form the imaging system. These functional modules are defined as the x-ray source 12, the precision stepper 14, and the coded aperture detector 16. The components of these modules have been separately described in the published literature and have been separately embodied in physical devices for other applications. Generally, module 12 selects an energy band ΔE from a broad-band energy source using a diffractive mirror. The selected energy is passed through a diffractive optic, such as a Fresnel Zone Plate, or otherwise directed, to generate a focused x-ray spot in the target. Generally, module 14 moves the work, that is, the target object, around the focused x-ray spot to build up 3-dimensional image of the target volume. Generally, module 16 uses a highly efficient, non-diffractive confocal coded aperture, such as a Fresnel Zone Plate or a Uniformly Redundant Array, to collect the scattered x-ray energy. Reconstruction of the point is achieved digitally using the aperture correlation relationship:

Point=I*A, where I is the intensified image and A is the aperture function.

The x-ray module 12 comprises an x-ray source 18 to generate the focused spot of x-ray energy 20 that is required to illuminate the target or inspection volume 22 of the inspected object. The x-ray source is reflected from a diffractive mirror 24 to select a small bandwidth of energy. A different band of energy can be selected for interrogating the target volume by changing the angle of incidence on the grazing mirror. The selected x-ray energy is passed through a diffractive optic such as a Fresnel Zone Plate (FZP) 26. The FZP is surrounded by a shield baffle 27 to reduce stray signal from other scatter points in the target volume scattered off of the path of the focused beam spot 20. The FZP will focus the x-ray energy to a small spot size within the target volume. The FZP will focus different energies from the X-ray source at different distances from the FZP. For this reason, it is preferable that a small energy band be selected. The energy band will be selected based on the material properties of the object to be inspected, for example to increase structural or material contrast.

The stepper module 14 is required to move the target volume around the focused spot. The stepper 28, the movement of which is represented by a three-dimensional axis diagram 30, can provide either discrete stepping capabilities or continuous scan of the part through the target volume. The ability to continuously scan the part will depend on the intensity of the x-ray source and on the scattering properties of the material. Discrete stepping can be required to allow increased integration time on the intensifier screen for some applications. Precision stepper technology is known and is in use in the semiconductor industry for precision placement of wafers in lithography systems and for movement of wafers on inspection platforms. The resolution of the system will be a function of the stepper precision. State-of-the-art steppers can today achieve positional accuracies of better than 1 micron.

The coded aperture detector module 16 is a particularly advantageous aspect of the inventive arrangements. A beam 31 of energy scattered from the target volume is collected through the coded, non-diffractive confocal coded aperture 32, exhibiting a desired impulse response characteristic. Coded aperture 32 can be implemented, for example, with a Fresnel zone plate, a uniformly redundant array or a random pinhole array. A shadow of the aperture is transmitted to an integrating amplifier 34 from every point source of radiation in the target volume. Integrating amplifiers can include, for example, intensifier screens The energy scattered beam 31 is surrounded for most of the distance to the intensifier screen by a shield baffle 33 to reduce stray signal. The image that results is referred to as a pseudo-hologram because the resulting image contains intensity information about the source but contains no phase information. The image at the intensifier screen is reconstructed into an image of the point source by mathematical correlation of the intensifier image with a digital version of the coded aperture known as a balanced decoder. In the embodiment explained later in connection with FIG. 2, an analog version of the coded aperture is used for the correlation. The resulting plot 38, in the reconstruction plane 40, is an image of the x-ray point source that has been scattered from the target volume. As the stepper 28, 30 moves the target through the specified volume, a three-dimensional image is constructed.

The advantage of using the coded aperture is two-fold. Firstly, the solid angle collection efficiency of the detector module is high due to the large cross-sectional area of the coded aperture, therefore allowing short integration times on the intensifier array while maintaining high signal-to-noise. Secondly, the resolution of the reconstructed X-ray spot is high due to the frequency transfer properties of the coded aperture itself.

The resultant image of the x-ray point source can be analyzed to select the central-most reconstruction intensity to represent the x-ray source. The result is a representation of the imaged x-ray spot that can be greater than the physical spot itself.

The contrast between different materials can be varied, that is spectroscopically, by changing the angle θ between the incident focused beam 20 and the scattered beam 31.

Figure 2:
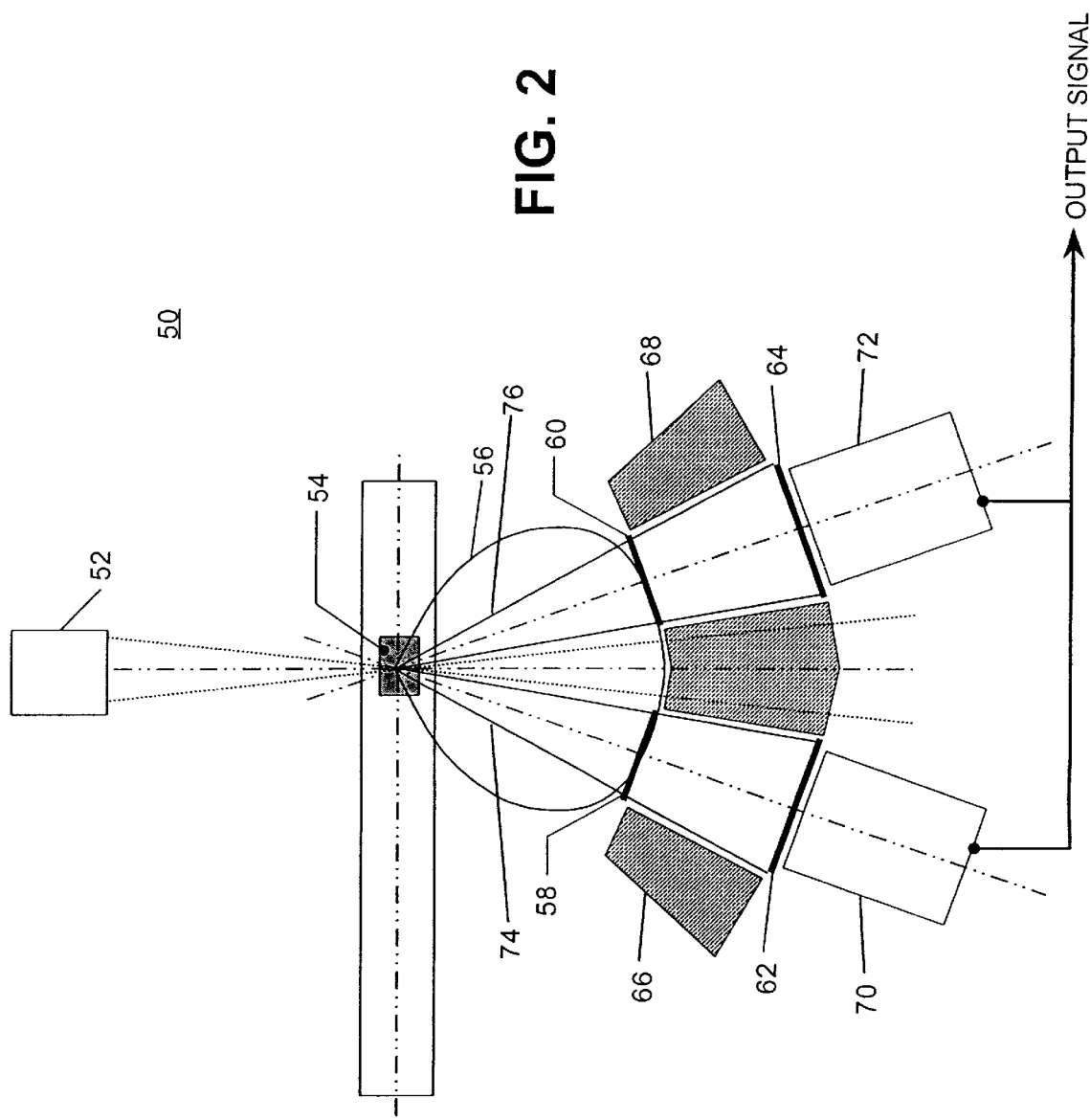
FIG. 2 is a schematic diagram of an alternative embodiment using multiple confocal coded apertures.

An alternative embodiment 50 utilizing multiple coded apertures is shown in FIG. 2. The reconstruction of the encoded image represented by the original drawing is typically achieved by either recording P(x,y) on film and reconstructing optically, or by recording the image digitally and reconstructing the object computationally. The embodiment shown in FIG. 1 is a digital approach that, in many respects, relies on a high-resolution CCD camera. The encoded image is decoded, that is reconstructed, by digitally correlating the image P(x,y) with a digital decoder $A_d(x,y)$. This approach can require the use of a high-resolution CCD device in conjunction with a high-speed digital signal processing (DSP) board and tends to be computationally intensive, requiring a large digital memory for data manipulation. The alternative embodiment 50 demonstrates how the CCA process can be simplified and how the dependency on specialized, high-speed imaging and DSP hardware can be reduced.

Imaging system 50 comprises a focused x-ray source 52 which interrogates a target subject volume 54. The interrogation results in a forward scattering of the x-rays, as indicated by boundary 56.

The goal of the imaging systems taught herein is to reconstruct a single point of scattered x-ray energy prior to scanning to the next point. A full correlation of the encoded image, P(x,y), with the decoding aperture $A_d(x,y)$ need not necessarily be performed per point to accomplish this, as is suggested by the first embodiment. It is actually only the center point which must be recovered. This aspect of the inventive arrangements is represented by the following equation, $$O_R(x,y)_z = \int\int P(\alpha,\beta)A_d(x-\alpha,y-\beta)d\alpha d\beta = \int\int P(\alpha,\beta)A_d(\alpha,\beta)d\alpha d\beta|_{x=0,y=0}$$

evaluated at (x,y)=0. Therefore, to recover the central point of the correlation only a simple matrix multiplication and summation is required. This process is simplified even further if the multiplication can be achieved in an analog manner as shown in FIG. 2. Encoding apertures 58 and 60 are placed in respective optical paths 74 and 76 with a scaled version used for decoding. Decoding apertures 62 and 64 are placed over respective integrating photo multiplier tubes (PMT) 70 and 72. Unwanted scattering is controlled by x-ray absorbing baffles 68. Each PMT will perform the multiplication and summation required by the above equation. The amplitude of the output of the PMT will therefore be directly proportional to the intensity of the scattered energy from the interrogated point. By using multiple aperture/PMT configurations as shown, an increased collection efficiency can be achieved. Two aperture/PMT combinations are shown, but several can be used. The output signal will take the form $(v_x t, v_y t, v_z t) = f(PMT_1 + PMT_2 + \ldots)$.

Since the PMT integrates the radiation source passing through the encoding and decoding apertures, there is no further requirement for an imaging sensor or digital signal processing architecture to process the image data. Using this design, the high-resolution and high-collection efficiency properties of the coded aperture system are maintained as well, but the processing complexity is greatly reduced and the system throughput is limited only by the amount of time necessary to integrate enough x-rays.

The method and apparatus are unique in many respects. The CCA system makes use of a new technology for providing a highly focused, and therefore dense x-ray source in a three-dimensional imaging environment. The application of a highly focused x-ray source as a source point in the target volume for the imaging system results in an efficient and highly energetic source for the coded aperture x-ray collection module, while reducing the amount of scattering coming from other points in the target volume, as the beam passes through the target object. The application of the coded aperture approach to collect the energy from a single point, as the point is scanned through the target volume, mitigates artifacts typically associated with coded aperture imaging systems. The use of a shield/baffle material on the front-end of the coded aperture system reduces stray signal from other scatter points in the target volume. A representation of the imaged x-ray spot can be greater than the physical spot itself. The ability of the system to image a sub-volume of the entire object under inspection can increase the inspection throughput of complex, multi-layered, multi-component objects by allowing for inspection only in critical areas. This reduces the overall exposure of the object to x-ray radiation, which can be critical depending on the application.

Although the presently preferred embodiments described herein are imaging systems to analyze a micro-volume of a complex object using x-ray energy, the system can be scaled to non-destructively analyze macro volumes, for example in large machinery components. The inventive arrangements need not be limited exclusively to x-ray energy. As long as the energy source can be focused, it can be used to interrogate a volume of interest. Alternative energy sources can include microwaves or neutrons, although focusing a source of neutrons is not believed to be presently feasible.

The presently preferred embodiments can also be characterized as imaging systems enabling high-resolution, high throughput inspection of next generation multi-layer microelectronic packages. These are very high tolerance devices that contain many layers of interconnects, plastics, conductors, and epoxy resins. The x-ray inspection technology is not limited to this environment and can find suitable application to other areas of semiconductor manufacturing, such as high resolution (for example<0.1 micron) wafer inspection. The inventive arrangements can also be applied to any circumstance where a detailed, non-destructive analysis is required of a complex object that will not be damaged by x-ray radiation, or that can withstand a limited exposure or dose.

What is claimed is:

1. A method for imaging a target volume, comprising the steps of:
   radiating a small bandwidth of energy toward the target volume;
   focusing said small bandwidth of energy into a beam;
   moving the target volume through a plurality of positions within said focused beam;
   collecting a beam of energy scattered from the target volume with a non-diffractive confocal coded aperture;
   generating a shadow image of said aperture from every point source of radiation in the target volume; and,
   reconstructing said shadow image into a 3-dimensional image of said every point source by mathematically correlating said shadow image with a version of said coded aperture.

2. The method of claim 1, comprising the step of correlating said shadow image with a digital version of said coded aperture.

3. The method of claim 1, comprising the step of correlating said shadow image with an analog version of said coded aperture.

4. The method of claim 1, comprising the step of generating said shadow image of said aperture by integrating and amplifying said beam of energy scattered from the target volume collected with said aperture.

5. The method of claim 4, comprising the step of integrating and amplifying said scattered beam of energy with an image intensification screen.

6. The method of claim 4, comprising the step of integrating and amplifying said scattered beam of energy with a photo multiplier tube.

7. The method of claim 1, further comprising the step of shielding said aperture.

8. The method of claim 1, comprising the step of radiating said small bandwidth of energy with x-rays.

9. The method of claim 1, comprising the step of diffracting said small bandwidth of energy into said focused beam with a Fresnel zone plate.

10. The method of claim 1, comprising the step of incrementally stepping said target volume through said plurality of positions.

11. The method of claim 1, comprising the step of continuously moving said target volume through said plurality of positions.

12. The method of claim 1, comprising the step of collecting said beam of energy scattered from the target volume with a coded aperture construct exhibiting a desired impulse response characteristic.

13. The method of claim 1, comprising the step of collecting said beam of energy scattered from the target volume with at least one of a uniformly redundant array, a random pinhole array and a Fresnel zone plate.

14. The method of claim 1, further comprising the step of shielding around said small bandwidth of energy during said diffracting step.

15. The method of claim 1, further comprising the step of selecting said small bandwidth of energy by directing a broad spectrum of said energy at a diffractive reflector.

16. The method of claim 1, comprising the step of radiating x-ray energy.

17. An apparatus for imaging a target volume, comprising:
- a radiation source of a small bandwidth of energy;
- a diffractive member for focusing said small bandwidth of energy into a focused beam illuminating said target volume;
- a carrier for moving the target volume through a plurality of positions within said focused beam:
- a non-diffractive confocal coded aperture for collecting for a beam of energy scattered from the target volume;
- an integrating amplifier onto which a shadow image of said aperture is transmitted from every point source of radiation in the target volume; and,
- means for reconstructing said shadow image into a 3-dimensional image of said every point source by mathematically correlating said shadow image with a version of said coded aperture.

18. The apparatus of claim 17, wherein said integrating amplifier comprises at least one of an intensifier screen and a photo multiplier.

19. The apparatus of claim 17, wherein said shadow image is correlated with a digital version of said coded aperture.

20. The apparatus of claim 17, wherein said shadow image is correlated with an analog version of said coded aperture.

21. The apparatus of claim 17, further comprising shielding for said aperture.

22. The apparatus of claim 17, wherein said small bandwidth of energy is x-ray energy.

23. The apparatus of claim 17, wherein said diffractive member comprises a Fresnel zone plate.

24. The apparatus of claim 17, wherein said carrier incrementally steps said target volume through said plurality of positions.

25. The apparatus of claim 17, wherein said carrier continuously moves said target volume through said plurality of positions.

26. The apparatus of claim 17, wherein said non-diffractive coded aperture comprises a Fresnel zone plate.

27. The apparatus of claim 17, wherein said non-diffractive coded aperture comprises a coded aperture construct exhibiting a desired impulse response characteristic.

28. The apparatus of claim 17, wherein said non-diffractive coded aperture comprises at least one of a uniformly redundant array, a random pinhole array and a Fresnel zone plate.

29. The apparatus of claim 17, further comprising shielding around said diffractive member.

30. The apparatus of claim 17, further comprising a diffractive reflector for selecting said small bandwidth of energy.

31. An apparatus for imaging a target volume, comprising:
- a radiation source of a small bandwidth of energy;
- a diffractive member for focusing said small bandwidth of energy into a focused beam illuminating said target volume;
- a carrier for moving the target volume through a plurality of positions within said focused beam;
- at least two sets of detectors for collecting respective parts of a beam of energy scattered from the target volume, each of said at least two sets of detectors having respective non-diffractive confocal coded collecting apertures and respective integrating amplifiers onto which respective shadow images of said respective apertures are transmitted from every point source of radiation in the target volume in said respective part of said beam; and,
- means for reconstructing said respective shadow images into respective 3-dimensional images.

32. The apparatus of claim 31, wherein said reconstructing means comprises means for mathematically correlating said respective shadow images with respective versions of said respective coded apertures.

33. The apparatus of claim 32, wherein said reconstructing means further comprises means for combining output signals generated by said respective integrating amplifiers.

34. The apparatus of claim 31, wherein said integrating amplifiers comprise photo multiplier tubes.

* * * * *